United States Patent [19]

Tull et al.

[11] 3,954,031

[45] May 4, 1976

[54] SOUND-DEADENING DEVICE
[75] Inventors: Mark E. Tull; John H. Freis, both of Rockford, Ill.
[73] Assignee: Frelun Engineering Company, Inc., Rockford, Ill.
[22] Filed: Sept. 12, 1975
[21] Appl. No.: 612,755

[52] U.S. Cl. .............................. 82/38 A; 181/33 M
[51] Int. Cl.² ........................................ B23B 13/00
[58] Field of Search..................... 82/38 A, 2.5, 2.7; 181/33 M

[56]  References Cited
UNITED STATES PATENTS

| 2,512,335 | 6/1950 | Kholos | 82/38 A |
|---|---|---|---|
| 2,915,089 | 12/1959 | Horsting | 82/38 A |
| 3,693,810 | 9/1972 | Gumhold | 82/38 A |
| 3,828,630 | 8/1974 | Argereu | 82/38 A |

Primary Examiner—Leonidas Vlachos
Attorney, Agent, or Firm—Wolfe, Hubbard, Leydig, Voit & Osann, Ltd.

[57]  ABSTRACT

A sound-deadening device for use in a feed tube for bar stock includes a radially resilient sleeve having a relaxed diameter greater than the diameter of said tube so as to be held frictionally within the tube in a preselected position by expanding outwardly against the interior surface of the tube. Telescoped into the sleeve is a generally cylindrical backing having the outer ends of a plurality of generally radial bristles embedded therein. The bristles extend inwardly from the backing and include inner ends defining a central passage through the sleeve. The bristles support bar stock within the feed tube and, during rotation of the stock, resiliently cushion the stock against striking the interior of the tube thereby deadening the noise otherwise caused by rotation of the stock within the tube.

9 Claims, 4 Drawing Figures

SOUND-DEADENING DEVICE

BACKGROUND OF THE INVENTION

The present invention relates to a sound-deadening device of the type used in the feed tubes of a machine to cushion the impact of bar stock against the interior surfaces of the feed tubes as the stock is rotated within the tubes during operation of the machine. More particularly, the invention relates to a sound-deadening device of the type which is telescoped in a feed tube with the bar stock being telescoped through the device so the latter serves to resiliently cushion the impact of the rotating stock against the interior surface of the tube. One device of this general character is disclosed in U.S. Pat. No. 3,828,630.

SUMMARY OF THE INVENTION

The primary object of the present invention is to provide a novel device for deadening sound within feed tubes for bar stock which device not only is easier to use and has an improved sound deadening capability over prior similar devices but also is adapted particularly for use in conjunction with a wide range of different sizes and shapes of bar stock.

A more detailed object is to construct the sound-deadening device so that it is substantially more resistant to wear than prior devices of a similar character.

The invention also resides in the novel construction of the device wherein a plurality of resiliently flexible bristles are utilized within the feed tube to support the stock away from the interior surface of the tube and to keep the bar stock from striking solidly against the surface upon being rotated within the tube.

Still further, the invention resides in the novel construction of the device in enabling the bar stock supporting bristles to be easily inserted, located and secured within the feed tube in a selected position to support the bar stock while the latter is fed through the tube and into the machine.

These and other objects and advantages of the present invention will become more apparent from the following detailed description when taken in conjunction with the accompanying drawings.

DETAILED DESCRIPTION OF THE PREFERRED EMBODIMENT

Figure 1:
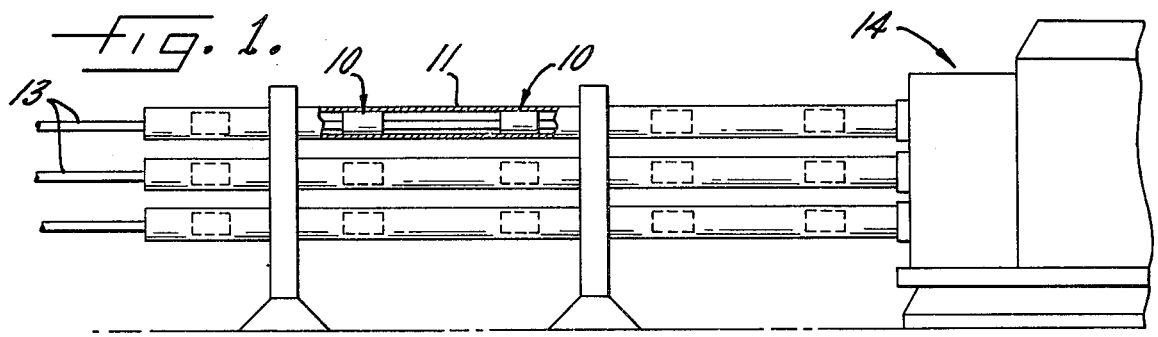
FIG. 1 is an elevational view of a machine having feed tubes equipped with sound-deadening devices embodying the novel features of the present invention.
Figure 2:
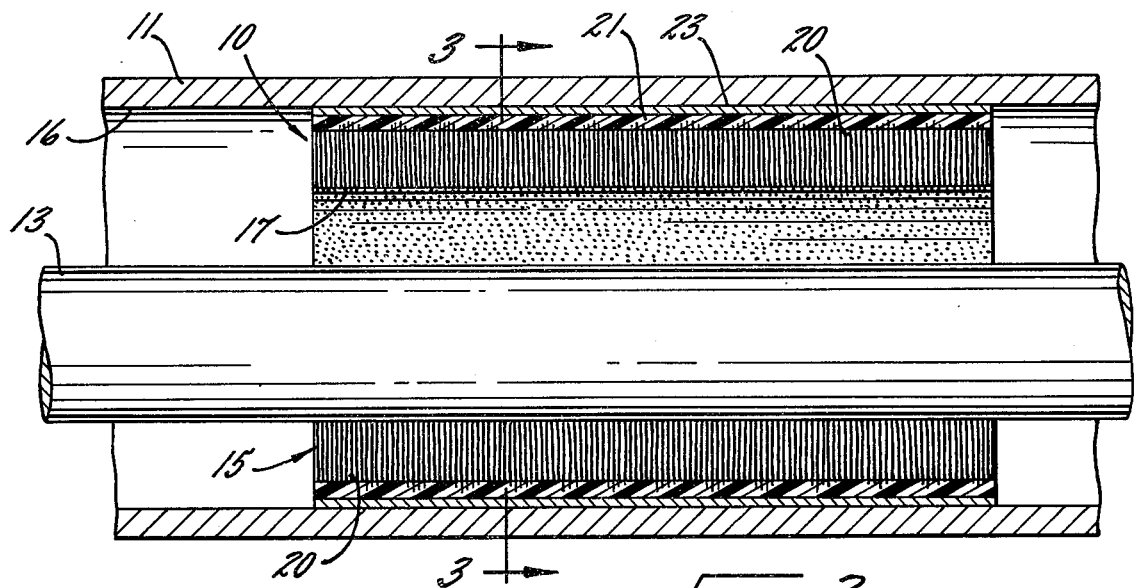
FIG. 2 is an enlarged, cross-sectional view of the exemplary sound-deadening device as installed in a feed tube.
Figure 3:
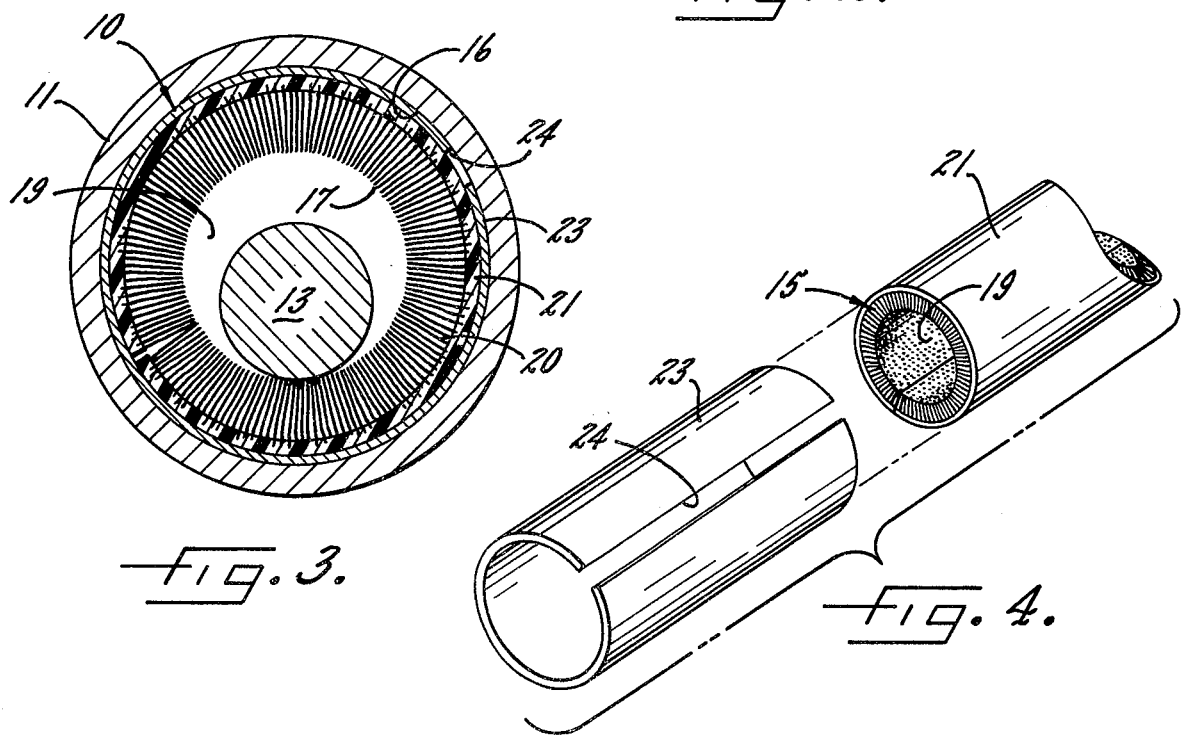
FIG. 3 is a cross-sectional view taken substantially along line 3—3 of FIG. 2.

As shown in the drawings for purposes of illustration, the present invention is embodied in a sound-deadening device 10 particularly suited for use in a feed tube 11 through which bar stock 13 is fed into a machine 14 to reduce the noise and clatter otherwise associated with the movement of the stock through the tube. Primarily, the noise generated in the feed tubes of a machine is caused by the bar stock striking the interior surfaces of the tube as the stock is moved within the tube such as when being rotated by a spindle in the machine.

In accordance with the primary aspect of the present invention, the sound-deadening device 10 is constructed in a particularly unique fashion so as to more effectively cushion the impact of the bar stock 13 against the inside of the feed tube 11 and thereby substantially reduce the noise level generated by movement of the stock within the tube. For this purpose, the device includes a band of resiliently flexible bristles 15 telescoped into the feed tube with the individual bristles connected to the interior surface 16 of the tube and extending in a generally radial direction away from such surface toward the center of the tube. The inner ends 17 of the bristles are spaced radially outward from the axis of the tube and thus define a central passage 19 through which the bar stock slides upon being fed through the tube. By virtue of this construction a wide range of bar stock smaller in size than the diameter of the passage may be fed easily through the tube without substantial loss in the sound-deadening effect produced by the device. Moreover, because of the flexible resiliency of the bristles, the device is more resistant to wear and thus has a long service life.

In the present instance, to facilitate mounting of the bristles 15 in the feed tube 11 the outer radial end portions 20 of the bristles are embedded in a backing 21. Herein, the bristles are resiliently flexible being formed of a polypropelene material and having a Rockwell hardness in the neighborhood of 95A. The backing is formed of a resinous material such as polyurethane and one form of the combination of the bristles and backing currently available as a commercial product is marketed by Minnesota Mining and Manufacturing Company of St. Paul, Minnesota, under the trademark Brushlon.

Figure 4:
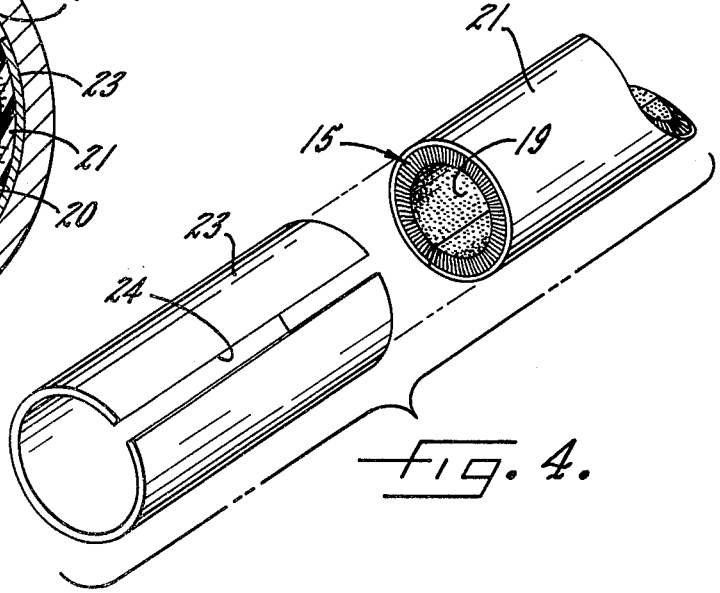
FIG. 4 is an exploded perspective view of the sound-deadening device.

As shown in FIG. 4, in forming the device 10, the combined bristles 15 and backing 21 are cut in the shape of a generally rectangular pad which is rolled into the cylindrical band and telescoped into a cylindrical sleeve 23. Preferably, the sleeve is radially resilient, being formed of a resilient metal such as spring steel. It will be appreciated, however, that sleeves of other shapes may be equally well suited for use in conjunction with the bristle pad depending upon the conditions under which the sound-deadening device is to be used such as the specific shape of the feed tube into which the sound-deadening device is to be placed. Extending in a longitudinal direction along the full length of the sleeve is a slit 24 formed through the side of the sleeve and permitting the radial expansion and contraction of the sleeve. Advantageously, the inside diameter of the sleeve in its relaxed state is slightly smaller than the diameter of the cylindrical band of bristles. Accordingly, when the band is telescoped into the sleeve, the latter grips the band frictionally holding it within the sleeve.

To hold the device 10 within the feed tube 11 the outside diameter of the sleeve 23, when relaxed, is greater than the inside diameter of the feed tube. Thus, for easily mounting the device in the tube, the sleeve may be compressed radially and then telescoped into the tube, the device being pushed axially along the tube until located in the position desired. In its desired position, the expansion of the sleeve outwardly against the interior surface of the tube creates a frictional lock between the tube and the sleeve to secure the device in place. It will be appreciated, however, that other means of securing the device within the tube may be employed with equal success in practicing the present invention.

In service use, several of the exemplary devices 10 are mounted within the feed tube 11 with the devices being spaced equally from each other along the length of the tube to provide support for the bar stock along the full length of the tube. Normally, upon being rotated by the spindle of the machine 14, the bar stock 13 tends to whip from side to side within the tube. The bristles 15 struck by the stock, however, flex and resiliently urge the bar stock toward the center of the passage 19 so that the stock advantageously rotates more truly about the axis of the tube without excessive whipping from side to side. Through the unique centering action provided by the bristles and because of the air spaces between the bristles, a substantial reduction in noise is achieved with the exemplary sound-deadening device over prior similar devices. Moreover, when struck by the bar stock, the bristles flex in the direction of movement of the stock, moving with the stock. Accordingly, instead of resisting movement of the stock and becoming worn, the bristles resist wear by flexing and moving with the stock.

We claim:

1. In combination, a feed tube for guiding bar stock into a machine, a plurality of resiliently flexible bristles secured within said tube and extending inwardly from the interior surface of said tube and toward the central axis thereof in a generally radial direction a distance substantially less than the length of the radius of said tube, said bristles serving to support said bar stock within the tube and away from said interior surface thereby to deaden the sound caused by the bar stock as the latter is rotated and fed through the tube during operation of the machine.

2. The combination as defined in claim 1 wherein said bristles define a substantially annular band extending generally around the interior of said tube with the inner ends of said bristles defining a passage through which said bar stock is fed.

3. The combination as defined by claim 2 including means for securing said bristles to the interior surface of said tube.

4. The combination as defined by claim 3 wherein said securing means includes a generally cylindrical, radially resilient sleeve, said bristles being secured within said sleeve, said sleeve having a relaxed diameter greater than the interior diameter of said tube and including a generally longitudinal slit formed through and extending along the full length of one side thereof, said sleeve expanding radially outward against the interior surface of said tube so as to be held frictionally in a preselected position within said tube.

5. The combination as defined by claim 4 wherein the diameter of said passage defined by said bristles is at least as great as the maximum thickness of the bar stock to be fed through said tube.

6. The combination as defined by claim 5 wherein said securing means further includes a generally cylindrical backing telescoped into and being held frictionally within said sleeve, the radially outward end portions of said bristles being embedded within said backing.

7. The combination as defined by claim 6 including a plurality of said sleeves spaced from each other along the length of said tube, each of said sleeves having an annular band of said bristles secured therein.

8. A sound-deadening device for use within a tube for feeding bar stock along a predetermined path, said device comprising, a generally tubular sleeve adapted to be telescoped into and secured within said tube in a selected position from one end thereof, and a plurality of resiliently flexible bristles secured to the interior surface of said sleeve, said bristles extending inwardly from said surface generally toward the central axis of said sleeve with the inner ends of said bristles defining a central passage through said sleeve, said passage being at least as large as the maximum thickness of the bar stock to be fed through said tube, said bristles supporting said stock against striking the interior surface of said tube as the stock is moved through said tube thereby substantially reducing the noise otherwise associated with such movement.

9. A sound-deadening device for use within a tube for feeding bar stock along a predetermined path and into a machine, said device comprising, a generally tubular, radially resilient sleeve having a generally longitudinal slit formed through and extending along the length of one side thereof, said sleeve further having a relaxed diameter greater than the interior diameter of said tube so that when telescoped into a selected position in said tube said sleeve is held frictionally within such position by expanding against the interior surface of the tube, a generally cylindrical backing telescoped into said sleeve, and a plurality of generally radially extending, resiliently flexible bristles having outer end portions embedded in said backing, a central passage through said sleeve being defined by the inner ends of said bristles, said passage having a diameter at least as large as the maximum thickness of the bar stock to be fed through said tube whereby said bristles support said stock against striking the interior surface of said tube as the stock is moved through the tube thereby substantially reducing the noise otherwise caused by said stock as it is moved through the tube.

* * * * *